Oct. 10, 1967 I. O. SALYER ET AL 3,346,219
MAT STRUCTURE
Filed April 15, 1966
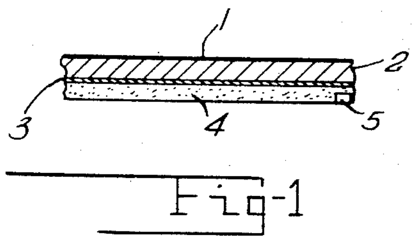
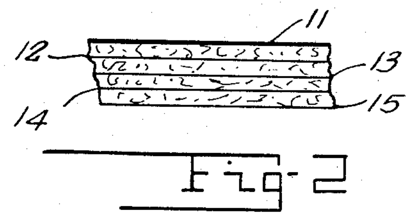
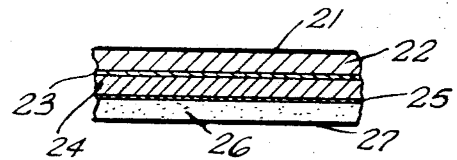
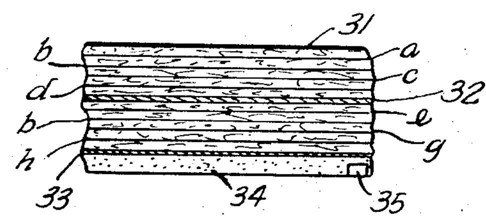
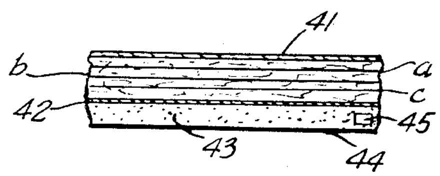
INVENTORS
IVAL O. SALYER
JAMES L. SCHWENDEMAN
BY Mary B. Moshier
ATTORNEY United States Patent Office 3,346,219

Patented Oct. 10, 1967

1

3,346,219

MAT STRUCTURE

Ival O. Salyer and James L. Schwendeman, Dayton, Ohio, assignors to Monsanto Research Corporation, St. Louis, Mo., a corporation of Delaware Filed Apr. 15, 1966, Ser. No. 542,777
10 Claims. (Cl. 244—114)

ABSTRACT OF THE DISCLOSURE

A composite mat assembly for use as a landing or take-off site for vertical takeoff aircraft, comprising a heat-curable resin, an inorganic support such as glass cloth, and layers of pyrotechnic composition, with means for compacting it and springing it open into a flat shape.

The present invention relates to the landing aircraft and more particularly provides a new and valuable means of landing high lift aircraft such as vertical take-off and landing (VTOL) and vertical and short take-off and landing (V/STOL) aircraft.

The development of aircraft capable of vertical or extremely short landing and takeoff has been of much interest owing to the ability of such craft to operate into and out of small landing fields rather than the very large fields required by conventional high speed jet planes. However, the high downwash velocities and temperatures associated with high lift aircraft restrict takeoff and landing to carefully prepared sites or at least to predetermined areas having proper structure. The sites must be capable of withstanding high loads plus the extreme temperatures and blasts of the lifting engine. Damage to the neighboring area and to the vehicle from flying debris resulting from impact at high temperatures must be avoided. Also, the impingement of the downwash velocity on the ground results in the development of negative pressure under the aircraft, thereby producing suckdown and travel of such debris to the craft.

Although VTOL and STOL aircraft have been of interest in that their use offers a solution to the tremendous problems encountered in metropolitan transportation, they are of even potentially greater significance in military and exploratory operations. Remote-site operation requiring previously prepared areas has favored high-lift aircraft only in that while airborne vehicles usually require some readying or selecting of site, that required for the high-lift aircraft may be very small. The fact than an entirely different, much more difficultly prepared site must be provided for the high-lift aircraft has been regarded by some to negate the size advantage.

One method of "rapid" remote-site preparation which has been tried includes the use of a ground crew for distributing chopped glass rovings over the ground and then covering the rovings with a liquid hardenable resin. Since the resin is fluid, any irregularities in the ground plane cause the resin to run or drain away. Although air spraying and deposition of the treating agents, rather than on-site application, may be envisaged, the problem of run-off persists; moreover, existing vegetation at the site poses another challenge, because even grass and small shrubbery will retain the glass fiber and resin while the soil remains untouched. Obviously, neither the on-ground nor the air spray method provides a safe, rapid means of preparing landing sites in remote locations.

Accordingly, an object of this invention is the provision of improved landing and take-off sites for high-lift aircraft. Another object is the provision of an improved means of takeoff and landing of such craft. An important object is to provide a means of dissipating the impact force exerted by high-lift aircraft upon the takeoff and landing site.

2

These and other objects are attained by provision of a compactable, self-deployable mat structure which can be rolled up or folded for easy transportation and storage and which is capable of unrolling and providing its own heat for curing to give a tough, hard pad, said mat consisting essentially of (1) a shaped, flexible composite comprising a heat-curable resin in the mobile state as the matrix and inorganic reinforcing agent therefor, (2) a spring member integrally united with the composite for recovery of substantially the original shape of the composite after distortion, (3) a flexible layer of a sheeted pyrotechnic composition adapted to provide heat to the composite and separated from the composite by a flexible refractory, heat-conducting material which may be said spring member, and (4) pliant nontacky sheeting covering any exposed surface of said composite to permit compacting of the mat without adhesion.

By "pyrotechnic composition" is meant a physical mixture of materials which, upon combustion, readily undergo chemical reaction in which a considerable amount of heat is evolved in a relatively short period of time although, as compared to that of an explosive, the burning rate is relatively slow.

The structure may or may not contain a remotely actuated ignition means in contact with the pyrotechnic sheet. A pliant layer of fire-resistant material, e.g., asbestos sheeting, may or may not be used as a cover for any exposed surface of the pyrotechnic sheeting. In addition, there is advantageously, though not necessarily, employed a flexible case or housing for the mat. Such a case is conveniently fitted with a fastening means, whereby after rolling or otherwise compacting the flexible mat, restraint is placed upon the compacted unit for maintaining the compacted form.

In one embodiment of the invention the assembly of composite, spring and sheeted pyrotechnic composition in its pliant housing, e.g., a polyethylene or polyethylene terephthalate film is rolled into a compact unit and kept rolled by a fastening means fixed to the housing or simply by tying with cord. The compact unit is readily stored in, and transported by the high-lift craft. A few minutes previous to landing, the fastening is disengaged and the roll is dropped from the craft as it hovers over the proposed landing site. The spring element of the pad causes the pad to unroll, and it resumes its original form as it contacts the ground. The pyrotechnic component is then caused to evolve heat by actuating, from the hovering aircraft or other remote location an ignition means which is in contact with the material. This may be any intense heat producing device, e.g., an electrical resistance heater.

The composite may consist of a fibrous textile material, e.g., glass fiber cloth, wire screen or canvas which has been impregnated with the heat-curable resin and preferably two or more plies of the impregnated textile may be used to form a composite assembly. The composite may also consist of a thick paste or putty of the resin and the reinforcing agent, which may be present in fibrous or finely comminuted form.

By "spring element" is meant any body having the ability to resume substantially its original shape after being deflected. The function of the spring is to unroll or unfold the compacted mat. The spring may be a single or compound leaf spring, or a wire or coil spring of a metal, or hard, tough, leather-like rubber. A single, thin sheet may be used; or preferably, there may be employed a plurality of narrow leaf springs disposed unidirectionally at spaced intervals on one surface of the composite. Wire springs or coils may be used instead of, or with, the leaf spring. Instead of positioning the spring or springs on the surface of the composite, it may be embedded in the composite, whereby it can also serve as reinforcing agent.

The function of the spring is to deploy the mat after it has been compacted, e.g., by rolling. Therefore, whether or not the spring is within the composite or upon the surface of the composite is irrelevant, because the mobile state of the matrix does not prevent the spring function in resumption by the mat of its original shape. Spring function is unnecessary after the composite has been cured to give the hard landing pad.

The pyrotechnic composition is used in a sheet comprising a mixture of pyrotechnic fuel and oxidant in a matrix of a flexible, combustible polymeric material. As the fuel component of said mixture there may be used finely comminuted magnesium, aluminum, magnesium-aluminum alloy, zirconium or titanium or the hydrides thereof, phosphorous, charcoal, sulfur etc. Useful oxidants in the pyrotechnic mixture include, e.g., the nitrates, peroxides or chromates of barium or strontium, the oxides of lead, manganese, copper, silver or iron, potassium chlorate or perchlorate, etc. The matrix in which the pyrotechnic mixture is dispersed may be any flexible, mattable inorganic material such as asbestos and/or glass wool, or sheetable natural or synthetic polymer such as cellulose, a starch ester, casein, gelatin, polyvinyl alcohol, polyvinyl acetal, an unhardened epoxy resin, or polyurethane, a styrene/butadiene rubber, polyisobutylene, ethylene/vinyl acetate copolymer, polypropylene, etc. The choice of matrix will depend upon the burning rate of the pyrotechnic mixture. In most instances, it will be found that an incombustible, inorganic material is advantageously used because thereby the burning rate is more readily controlled to give an even source of heat for curing the composite. The pyrotechnic mixture in finely comminuted form may be incorporated into the inorganic matrix by milling or rolling; but preferably, by forming a paste or mastic of the matrix and pyrotechnic material, employing a liquid, vaporizable diluent if the matrix is a solid and subsequently casting or molding to the sheeted form. Economically, asbestos is the preferred matrix. This can be mixed in water with the pyrotechnic mixture to give a slurry which may be converted to a continuous sheet by casting and drying.

The sheet of pyrotechnic composition is readily ignited simply by application of a flame to one or more points along the edge thereof. In order to effect ignition from the distance, there may be employed, e.g., remotely activated electrical resistance heating. For this purpose, there may be used a short strip of resistance wire clamped, e.g., to each corner of the pyrotechnic sheet if the sheet is rectangular or at one or more strategic peripheral points if it is not. Instead of actuating a resistance wire, a laser may be remotely controlled. Also the ignition may be effected by causing an extremely reactive chemical agent, e.g., a peroxide or perchlorate to contact the pyrotechnic material. Time delay fuse powders together with friction or electrical igniters may also be used.

Upon ignition, the pyrotechnic material produces heat which is utilized for curing the heat-hardenable resin component of the composite. Provision of the pyrotechnic material in sheeted form generally serves to moderate the burning rate of the pyrotechnic composition; hence, and, because the pyrotechnic layer is separated from the composite by a refractory, heat-conducting layer, the curing proceeds at a substantially uniform rate. However, cure is generally effected within a very short period, i.e., within a time of from, say, two to ten minutes, because the pyrotechnic sheet distributes the heat along the entire area of the composite surface which is in contact with the heat-conducting refractory.

As herein stated, the refractory separating body may be the spring member. However, it may be a flexible metal sheet such as aluminum or other metal sheeting integral with the pyrotechnic sheeting during manufacture thereof or caused to adhere to the sheeting by use of any adhesive, e.g., the resin component of the composite portion of the pad or a silicate adhesive. The metal sheet may be simply stapled to the pyrotechnic sheeting or otherwise mechanically fixed to the sheeting. The opposite surface of the metal sheet, being adjacent to the mobile composite, adheres to it in its precured stage and becomes integral with the composite upon curing.

The pliant cover which is employed on any exposed surface of the composite serves primarily to prevent the mat from sticking to itself when it is rolled or otherwise compacted. Hence, it may consist of any flexible sheeting which has a non-tacky surface. A film of polymeric material, e.g., polyethylene, polyvinyl chloride, polyvinylidene chloride, polymeric tetrafluoroethylene, polyethylene terephthalate, etc., is conveniently useful for this purpose; however, cellulosic textiles or textiles woven from artificial fibers such as nylon or the polyesters may be used. Even though the cover may form the top surface of the mat, whereby it is subjected to the high impact load of the landing operation, the strength characteristic of the material from which it is made is not critical because after the composite has been cured, the cover becomes only an insignificant expendable portion of the landing pad.

The landing pad structure is not limited to one layer each of composite, spring, and pyrotechnic sheeting. Depending upon the nature of the individual materials, the thickness of the layers, the desired strength characteristics, and the permissible bulkiness, any number of such layers may be used. Various assemblies setting forth the features and advantages of the present invention will be apparent in connection with the accompanying drawing, wherein:

In FIGURE 1 there is schematically shown an assembly including a cover film 1 of polyethylene, composite layer 2 consisting of stacked plies of glass fiber cloth impregnated with a heat-curable resin in the mobile state and adhering to the upper surface leaf spring 3, and pyrotechnic sheeting 4 which is stapled or adhesively bonded to the lower surface of said spring and ignited by actuating the electrical resistance wire 5.

FIGURE 2 is a detail of the structure which may be employed in the composite portion of the landing pad, elements 12, 13, 14, 15 being sheets of glass fiber textile impregnated with a mobile, heat-curable resin and adhering to each other because of the intermediately deposited resin. Element 11, covering the top surface of the stacked assembly, is a film of polyethylene terephthalate for providing a smooth, nonsticky surface.

FIGURE 3 illustrates use of the composite material on either side of the spring element. The composites are putty-like mixtures of glass fiber and heat-curable resin. Thus, the smooth film 21 covers the top surface of composite 22, while the bottom surface of said composite adheres to one surface of spring element 23. The opposite surface of spring element 23 adheres to the lower composite 24, which is separated from pyrotechnic material 26 by the heat-conducting metal sheeting 25. Element 27 is asbestos sheeting fixed to the pyrotechnic material, e.g., by stapling.

In FIGURE 4, the layup is as in FIGURE 3, except that the composite portions are laminates. Thus smooth film 31 covers the surface of a stacked assembly of glass cloth plies *a, b, c* and *d* in a heat-curable matrix such as a polyurethane or epoxy prepolymer; a series of steel wire springs adhering to the bottom surface of the assembly makes up the spring layer 32 which also adheres to a composite formed from resin-impregnated, glass cloth plies *e, f, g* and *h*. Metal sheet 33 is used to separate this composite from pyrotechnic sheeting 34. Element 35 is an electrical resistance heater for igniting sheeting 34.

In FIGURE 5, spring leaf element 41 is used to cover one surface of a composite assembly consisting of the glass cloth plies *a, b,* and *c* which are impregnated with a heat-curable resin. The opposite surface of the composite assembly adheres to the flexible, heat-conducting sheeting 42 which is fixed to one surface of the pyrotechnic sheeting 43 by means of a heat-resistant organic adhesive. The opposite surface of the pyrotechnic sheet 43 is fixed to asbestos sheet 44. Electrical resistance element 45 is fixed within the pyrotechnic sheet 43.

In one embodiment of the invention, the layup shown in FIGURE 4 is prepared by employing as the base layer a length of pyrotechnic sheeting made by blending a mixture of powdered sulfur and iron, glass wool and fibrous asbestos in sufficient methanol to form a thick slurry, pouring the slurry into a filter mold, allowing the liquid to drain and suctioning almost to dryness, covering the residual pulp with asbestos and allowing the whole to dry to an 0.5" thick sheet analyzing by weight: 57.5% iron, 24.1% sulfur, 5.5% glass, and 5.5% asbestos and having an Fe+S content of 0.072 g./sq. cm. An electrical resistance heat unit 35 is fixed to each corner of the sheeting and at spaced intervals along the perimeter. Aluminum sheeting 33 is cemented by means of standard, commercial epoxy adhesive to cover that surface of the sheet which is not covered with asbestos, only spot cementing at spaced points being employed. A composite consisting of the 4 stacked plies (FIGURE 4, *e, f, g, h*) of 122–P glass fiber cloth is then formed on the aluminum sheeting, employing as the impregnating, matrix-forming resin a commercially obtained bisphenol-A/epichlorohydrin condensation polymer. The spring element 32 consists of a plurality of 0.25" wide, 0.01" thick steel leaf springs positioned parallel at spaced intervals over the entire top surface of the composite. A second composite, consisting of the glass cloth plies *a, b, c* and *d* and the same resin as matrix is formed on the top surface of the spring elements and covered with a polyethylene terephthalate film. The resulting assembly is rolled lengthwise, with the pyrotechnic base being on the outer side of the roll. Several windings of heavy cording and tight slip-knotting keep the roll from unwinding and permits easy transportation and storage. The rolled unit is readily converted into a landing pad by removing the cording in order to allow the leaf springs to resume their original form, then actuating the electrical resistance heat elements for igniting the pyrotechnic layer for heat-curing or hardening of the epoxy resin matrix of the composites. In laboratory testing, a 9" x 12" test specimen of the cured pad is found to support a 400 g. weight without sagging when the length of the specimen is employed to bridge two points and the weight is hung from the bridge center.

In another embodiment of the invention, there is used a composite which is prepared as follows: A commercially obtained polyester resin, prepared from reaction of maleic anhydride with a mixture of phthalic anhydride and hexachloro-2,3-norbornane-dicarboxylic anhydride to obtain a prepolymer containing olefinic double bonds and then reacting the prepolymer with styrene, was blended with a curing agent consisting of a 50% solution of benzoyl peroxide in tricresyl phosphate. The resulting mixture is rolled into woven glass rovings to give a trowellable mass having a resin content of 30%. FIGURE 3 of the drawings illustrates an assembly in which this composite is used. In preparing said assembly, a surface of the pyrotechnic sheeting described above is fixed to asbestos sheeting 27, the opposite surface of the pyrotechnic sheeting is stapled to aluminum or tin foil 25 and said composite is applied on top of the foil to give the composite layer 25 about a 0.5" thickness. Compound leaf springs 23 are positioned to cover the top surface of layer 25 and layer 22 of said composite is applied on top of the springs in about the same thickness. After covering layer 22 with film 21 of polyethylene, the assembly is rolled up and secured with ties. Just before dropping the rolled unit from a high-lift aircraft, the unit is untied. Owing to the spring action, it spreads out over the terrain upon which it has been dropped. Already present ground-crew or personnel parachuted from the craft can easily complete any still necessary arranging of the mat and ignite the pyrotechnic material; or ignition of the sheeting may be conducted by remote actuation of igniting means located along the periphery of the pyrotechnic material. The heat of the burning pyrotechnic readily cures the resinous matrix of the composite to convert the mat into a rigid, load-bearing pad.

In still another embodiment, there is used a composite in which the resin component was prepared by mixing 100 parts by weight of an epoxy-type prepolymer resin prepared from bisphenol A and epichlorohydrin with 110 parts of chlorendic anhydride. This mixture was used in the assembly illustrated in FIGURE 5, wherein one surface of the pyrotechnic sheet 43 is fixed, e.g., by spot cementing to asbestos sheeting 44, a plurality of the electrical resistance heating element 45 are positioned within or fixed to the periphery of the pyrotechnic sheeting, and the opposite surface of the pyrotechnic sheeting is covered by fixing thereon the heat-conducting foil 42. On the exposed top surface of the foil there are stacked plies *a, b* and *c* of glass cloth which have been thoroughly impregnated with the above-described mixture of prepolymer resin and chlorendic acid. On the top surface of the stack there is firmly positioned the spring element 41, consisting of a thick sheet of hard polypropylene. The entire assembly is then encased in a canvas jack (not shown) equipped with restraining means, e.g., buckles, grippers or slides, and the encased unit is forcibly compacted, e.g., by folding or rolling and secured in the compacted form by locking said restraining means. Upon release, the compacted unit spreads out, owing to the propensity of the polypropylene sheeting to resume its original shape. Ignition of the pyrophoric material cures the epoxy component and rigidizes the pad. The cavas cover and the asbestos layer provide against substantial damage by the burning pyrotechnic, so that the pyrotechnic layer need not be adjacent to the ground. On the other hand, use of the polypropylene to serve both as a covering for the sticky epoxy resin and as the spring element provides for increased resiliency and therefore greater shock resistance of the landing pad.

The composite which is employed in fabricating the compactable pad may comprise, as the resinous component, any organic polymeric material which is mobile at ambient temperatures and which is converted by heat to a hard or rigid, infusible polymer. Generally useful are the epoxy resins, e.g., the resinous condensation products of epichlorohydrin and a diol such as 4,4'-isopropylidenediphenol or 4,4'-isopropylidenedicyclohexanol. Another type of resinous material is provided by the polyurethanes wherein the constituents, e.g., an organic diisocyanate such as the 4,4'-tolylene diisocyanate, and a polyhydroxy compound such as a liqiuid polyalkyleneoxyalkylene glycol are mixed together to give a prepolymer containing terminal, unreacted isocyanate groups and the prepolymer is incorporated with sufficient additional polyhydroxy compound or other active hydrogen-containing compound to give a rigid structure upon heating. Phenolic resins of the Novolak type, together with an agent which converts them into infusible polymers upon heating, are likewise useful. The polyester resins, prepared by reaction of a polycarboxylic acid compound such as terephthalic acid and a polyhydroxy compound such as ethylene glycol and admixed with a heat-activated cross-linking agent are other examples of the presently useful polymeric materials in the mobile state.

The reinforcing means may be any inert, finely-comminuted, or fibrous inorganic material or a textile or flexible honeycomb structure made therefrom, e.g., carbon black or finely comminuted graphite, limestone or mica, rovings or fibers of glass, silica, or boron, etc. Particularly useful, owing to the high impact strength realized thereby and ease of availability, are the glass fiber textiles or woven glass rovings.

Although the presently provided compactable mats are particularly useful in the construction of landing pads for high-lift aircraft, they are generally useful in a variety of applications involving the fabrication of large flat, hard or rigid structures at remote sites. For example, they are useful in providing roofings for shelters, for bridging streams of water and canyons, as structural uints of housing and storage buildings, etc. Hence, the above examples and accompanying drawings are by way of illustration, only. It will be obvious to those skilled in the art that many variations are possible within the spirit of the invention, which is limited only by the appended claims.

What we claim is:

1. A compactable, self-deployable mat structure consisting essentially of (1) a shaped, flexible composite comprising a heat-curable resin in the mobile state as the matrix and an inorganic reinforcing agent therefor;

(2) a spring member integrally united with the composite for recovery of substantially the original shape of the composite after distortion;

(3) a flexible layer of a sheeted pyrotechnic composition adapted to provide heat to the composite and separated from the composite by a flexible, refractory, heat-conducting material which may be said spring member, and (4) a pliant nontacky sheeting covering any exposed surface of said composite to permit compacting of the mat without adhesion.

2. The mat structure defined in claim 1, further limited in that the sheeted pyrotechnic composition is in contact with a remotely actuated ignition means.

3. The mat structure defined in claim 1, further limited in that the heat-conducting, refractory material is other than the spring member.

4. The mat structure defined in claim 1, further limited in that one surface of the sheeted pyrotechnic composition is fixed to aluminum foil.

5. The mat structure defined in claim 1, further limited in that one surface of the sheeted pyrotechnic composition is fixed to aluminum foil which is fixed to the spring element and the opposite surface of the sheeted pyrotechnic composition is fixed to asbestos.

6. The mat structure defined in claim 1, further limited in that said composite consists of stacked plies of glass cloth impregnated with said heat-curable resin.

7. The mat structure defined in claim 6, further limited in that the resin is an epoxy resin.

8. The mat structure defined in claim 6, further limited in that the resin is a polyester resin.

9. The mat structure defined in claim 1, further limited in that the nontacky sheeting is polyethylene.

10. The mat structure defined in claim 1, further limited in that the sheeted pyrotechnic composition comprises finely comminuted iron and sulfur as the pyrotechnic mixture and asbestos and glass wool as the matrix.

References Cited

UNITED STATES PATENTS 3,096,956 7/1963 Oestrich ---------- 244—114

MILTON BUCHLER, *Primary Examiner.*

P. E. SAUBERER, *Assistant Examiner.*